Nov. 28, 1933.                    H. ARQUINT                    1,937,183
                            VEHICLE BODY FRAMEWORK
                            Filed Sept. 27, 1930
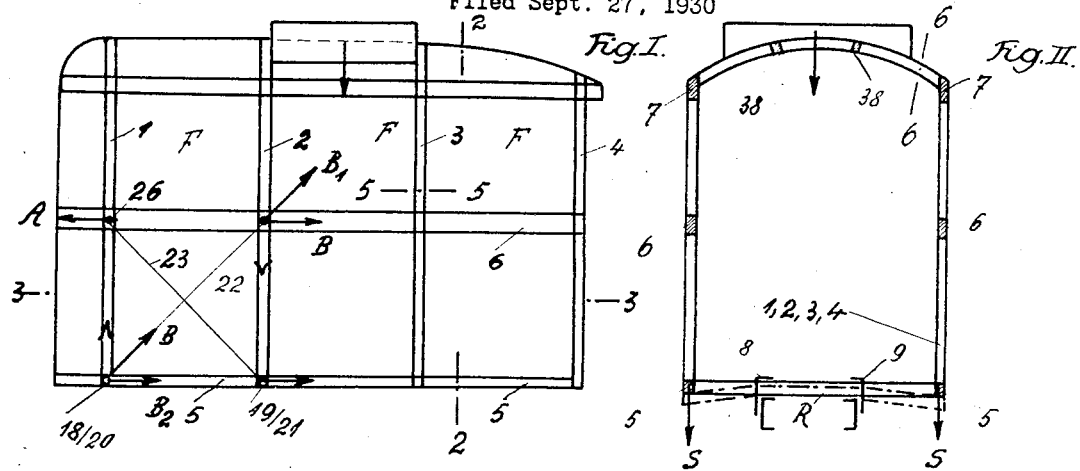
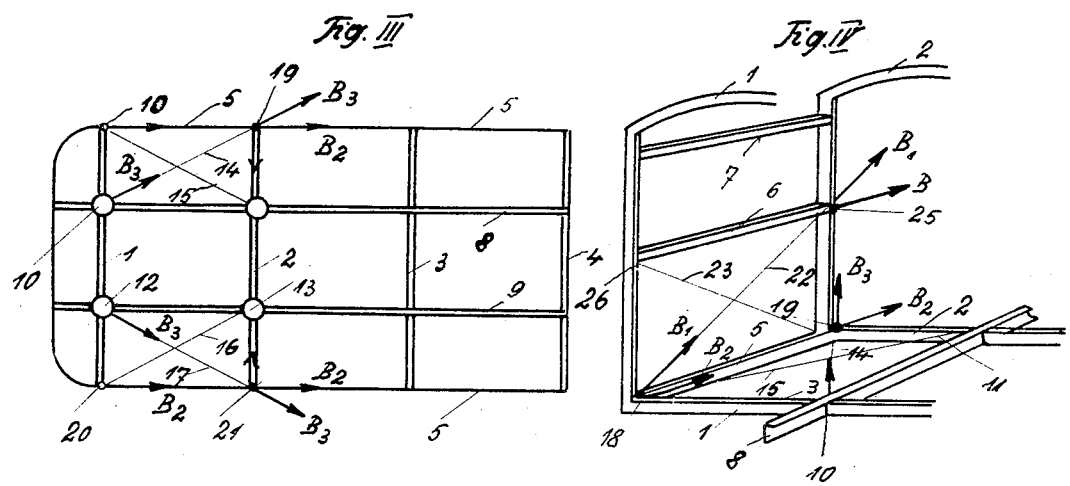
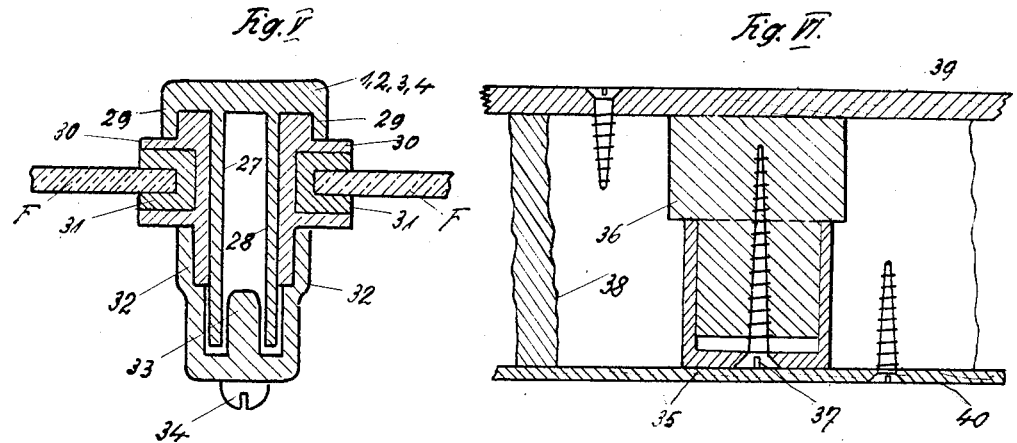
Inventor
Hans Arquint Patented Nov. 28, 1933

1,937,183

UNITED STATES PATENT OFFICE 1,937,183

VEHICLE BODY FRAMEWORK

Hans Arquint, Pasing, near Munich, Germany

Application September 27, 1930, Serial No. 484,906, and in Germany September 29, 1929

3 Claims. (Cl. 296—28)

This invention relates to a framework for vehicles, which is composed of transverse timbers, and consists in that between two frames strain elements and compression elements are arranged between the transverse supports in at least one section of the framework and further in that the posts in the side walls, are of such cross section, that they guide and clamp the window bars, the bottom transverse girders being made of elastic rolled material and the roof transverse girders of rolled rods of suitable section reinforced by wooden inserts.

An embodiment of the invention is illustrated by way of example in the accompanying drawing in which:

Fig. 1 shows in side elevation the framework for the body of a vehicle.

Fig. 2 is a vertical section on line 2—2 of Fig. 1.

Fig. 3 is a horizontal section on line 3—3 of Fig. 1.

Fig. 4 is a perspective view of one corner of the framework.

Fig. 5 is a horizontal section on line 5—5 of Fig. 1.

Fig. 6 is a vertical section on line 6—6 of Fig. 2.

The window panes are designated by F and the transverse frame or parts of the same by 1, 2, 3 and 4.

In the longitudinal direction of the body spacers 5, 6 and 7 are arranged and further longitudinal bottom girders 8 and 9 which connect the transverse frames 1, 2, 3 and 4 the one with the other, and at the points of intersection 10, 11, 12 and 13 with the vehicle frame R. The points of intersection 18, 19, 20 and 21 in the side walls are connected with the points of intersection 10, 11, 12 and 13 by means of crossing tie elements 14, 15, 16 and 17. The points of intersection in the side walls 18, 19, 20 and 21 are connected with the points of intersection 25 and 26 of the window posts by means of crossing tie elements 22 and 23. The arrow G indicates the luggage load and arrow lines S the total load composed of net weight and luggage.

The arrows B, B₁, B₂ in Fig. 1 indicate the retardation force, which occurs at the braking of the vehicle. By the tie-and-pressure connections 22—5—14/17 this retardation force B is transmitted from the point of intersection 25 of the window posts through the points of intersection 18/20 and 19/21 in the side walls to the stationary anchorage points 10/12. The transverse frame 2 is thereby secured accurately in its position. The other transverse frames are also secured in their positions with regard to the just mentioned frame 2 by the spacers 5, 6 and 7. The same occurs at the starting of the vehicle when the acceleration force A is transmitted upon the anchoring points 11/13.

As shown in Fig. 5, the window posts 1, 2, 3 and 4 are made for instance of iron or other suitable metal, rolled, drawn or put together. 27 and 28 are the middle arms of the T profile. 29 indicates the bent ends of the transverse arm; 30 and 31 are the window bars; 32 and 33 is a cap piece of M- or U-shaped cross section, which is fixed in the slot between the middle arms 27/28 by means of a screw 34. The window bars 30/31 are guided and clamped at the one side by the bent ends 29 of the transverse arm of the window post and on the other side by the middle arms 32 of the cap piece.

In Fig. 6, 35 designates a transverse roof girder of rolled section iron reinforced by a wooden insert 36, said insert being connected under tension by means of a long screw 37 with the section iron 35. Longitudinal roof girders 38 are embedded in the wooden insert 36. The outside plating 39 and the inside plating 40 can be screwed by wood screws against the wooden inserts 36 or against the longitudinal roof girders 38.

The bottom transverse girders, which form a constituent of the transverse timbers, may be made of resilient rod section irons and impart to the vehicle body, when the vehicle is travelling, a certain elasticity as they prevent the transmission of shocks to the body (see Fig. 2).

The invention applies in an analogous manner also to platforms of lorries, in which only the transverse bottom girders, the longitudinal bottom girders 8 and 9 and the spacers 5 are used.

The transverse timbers may be composed of several sections put together, or they may be open at the top or at the bottom, or closed like a ring, in which case they consist of one bottom transverse timber of two window posts and of one transverse roof girder. The transverse timbers are connected in the longitudinal direction of the vehicle body by spacers 5, 6 and 7, by longitudinal bottom girders 8 and 9 and by longitudinal roof girders 38 and so forth. The posts in the side walls, the longitudinal roof girders, the longitudinal bottom girders and the spacers consist preferably of light metal, the transverse bottom girders of spring steel.

I claim:

1. In a framework for bodies of vehicles a fixing means for window panes, comprising in combination transverse frames each having in cross section a transverse arm, two vertical middle arms spaced the one from the other, and two downwardly bent ends on said transverse arm, cap elements having each a middle projection engaging between said two spaced arms, and two lateral arms extending one on each side of said vertical arms, and window bars one on each side of said frames bearing against said vertical arms and directly rigidly clamped between said bent ends and said lateral arms.

2. A fixing means as specified in claim 1, in which each of said window bars extends upwards into the space between the outer side of one of the vertical middle arms and the adjacent bent end of the frame and bears against the under side of the transverse arm thereof, and downwards between the outer side of the lower end of this vertical arm and the inner side of one of the lateral arms of the cap, bearing at its end against a shoulder in said cap.

3. A fixing means as specified in claim 1, in which the transverse frames are made of rolled section iron substantially of T-shape cross-section with two middle vertical arms and the caps of inverted M-shape.

HANS ARQUINT.